United States Patent
Cho et al.

(10) Patent No.: US 12,051,777 B2
(45) Date of Patent: Jul. 30, 2024

(54) ELECTROLYTE SOLUTION FOR LITHIUM SECONDARY BATTERY AND LITHIUM SECONDARY BATTERY INCLUDING THE SAME

(71) Applicant: SK On Co., Ltd., Seoul (KR)

(72) Inventors: In Haeng Cho, Daejeon (KR); Myoung Lae Kim, Daejeon (KR); Sung Jin Kim, Daejeon (KR); Jin Hong Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 219 days.

(21) Appl. No.: 17/517,151

(22) Filed: Nov. 2, 2021

(65) Prior Publication Data

US 2022/0140393 A1 May 5, 2022

(30) Foreign Application Priority Data

Nov. 3, 2020 (KR) .................. 10-2020-0144888

(51) Int. Cl.
*H01M 10/0567* (2010.01)
*C07F 9/6574* (2006.01)
*H01M 10/0525* (2010.01)
*H01M 10/0569* (2010.01)

(52) U.S. Cl.
CPC ..... *H01M 10/0567* (2013.01); *C07F 9/65746* (2013.01); *H01M 10/0525* (2013.01); *H01M 10/0569* (2013.01); *H01M 2300/0025* (2013.01)

(58) Field of Classification Search
CPC ......... H01M 10/0567; H01M 10/0566; H01M 10/0569; C07F 9/65746
USPC ........................................ 429/163
See application file for complete search history.

(56) References Cited

U.S. PATENT DOCUMENTS

| 10,186,732 | B2 | 1/2019 | Yamamoto et al. | |
|---|---|---|---|---|
| 2003/0113605 | A1* | 6/2003 | Hidaka | H01M 8/1025 429/492 |
| 2007/0224515 | A1* | 9/2007 | Xu | H01M 10/0568 429/329 |
| 2011/0136019 | A1 | 6/2011 | Amiruddin et al. | |
| 2020/0119398 | A1 | 4/2020 | Cho et al. | |

FOREIGN PATENT DOCUMENTS

| CN | 103904363 A | | 7/2014 | |
|---|---|---|---|---|
| CN | 115763981 A | * | 3/2023 | ........ H01M 10/0525 |
| JP | 20084349 A | | 1/2008 | |
| KR | 1020120101499 A | | 9/2012 | |
| KR | 1020140073456 A | | 6/2014 | |
| KR | 101557560 B1 | | 10/2015 | |
| KR | 101559444 B1 | | 10/2015 | |
| KR | 1020200104772 A | | 9/2020 | |

* cited by examiner

*Primary Examiner* — Pamela H Weiss
*Assistant Examiner* — John S Medley
(74) *Attorney, Agent, or Firm* — The Webb Law Firm

(57) ABSTRACT

An electrolyte solution for a lithium secondary battery includes an organic solvent, a lithium salt, and a pentaerythritol diphosphite-based compound including at least one substituent selected from the group consisting of a silyl group, a sulfonyl group, a phosphoryl group and a phosphino group. A lithium secondary including the electrolyte solution is provided.

6 Claims, 1 Drawing Sheet

ELECTROLYTE SOLUTION FOR LITHIUM SECONDARY BATTERY AND LITHIUM SECONDARY BATTERY INCLUDING THE SAME

CROSS-REFERENCE TO RELATED APPLICATION

This application claims priority to Korean Patent Application No. 10-2020-0144888 filed Nov. 3, 2020, the disclosure of which is hereby incorporated by reference in its entirety.

BACKGROUND OF THE INVENTION

1. Field of the Invention

The present invention relates to an electrolyte solution for a lithium secondary battery and a lithium secondary battery including the same. More particularly, the present invention relates to an electrolyte solution for a lithium secondary battery including an organic solvent and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as an eco-friendly power source of an electric automobile such as a hybrid vehicle.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer (separator), and an electrolyte solution immersing the electrode assembly. The lithium secondary battery may further include an outer case having, e.g., a pouch shape.

Recently, as an application of the lithium secondary battery is expanded, the lithium secondary battery having higher capacity and power has been developed. For example, materials for a cathode and an anode capable of providing higher capacity is being researched.

For example, a side reaction between the electrolyte solution and an electrode may be accelerated at a high temperature condition to cause increase of an electrode thickness and an internal resistance of a battery.

For example, Korean Published Patent Application No. 10-2012-0101499 discloses a high voltage electrolyte for a lithium secondary battery, but developments of the electrolyte solution for enhancing properties at the high temperature condition are consistently required.

SUMMARY OF THE INVENTION

According to an aspect of the present invention, there is provided an electrolyte solution for a lithium secondary battery providing improved chemical stability and operational reliability.

According to an aspect of the present invention, there is provided a lithium secondary battery including the electrolyte solution and having improved chemical stability and operational reliability.

According to exemplary embodiments of the present invention, an electrolyte for a lithium secondary battery includes an organic solvent, a lithium salt, and a pentaerythritol diphosphite-based compound including at least one substituent selected from the group consisting of a silyl group, a sulfonyl group, a phosphoryl group and a phosphino group.

In some embodiments, the pentaerythritol diphosphite-based compound may be represented by Chemical Formula 1.

[Chemical Formula 1]

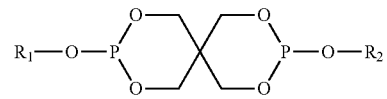

In Chemical Formula 1, $R_1$ and $R_2$ are each independently hydrogen, a $C_1$ to $C_{10}$ alkyl group, $-SiR_3R_4R_5$, $-SO_2R_6$, $-P(OR_7)_2$ or $-P(O)(OR_8)_2$, at least one of $R_1$ and $R_2$ is $-SiR_3R_4R_5$, $-SO_2R_6$, $-P(OR_7)_2$ or $-P(O)(OR_8)_2$, and $R_3$ to $R_8$ are each independently a substituted or unsubstituted $C_1$ to C10 alkyl group, a substituted or unsubstituted $C_6$ to $C_{12}$ aryl group, or a substituted or unsubstituted 5 to 12 membered heteroaryl group.

In some embodiments, the pentaerythritol diphosphite-based compound may include at least one of compounds represented by Chemical Formulae 2 to 5.

[Chemical Formula 2]

[Chemical Formula 3]

[Chemical Formula 4]

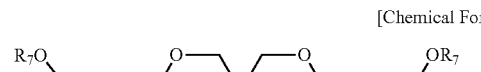

[Chemical Formula 5]

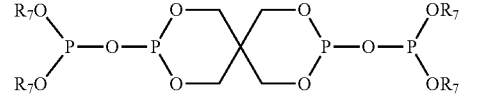

In Chemical Formulae 2 to 5, $R_3$ to $R_8$ are each independently a substituted or unsubstituted $C_1$ to C10 alkyl group, a substituted or unsubstituted $C_6$ to $C_{12}$ aryl group, or a substituted or unsubstituted 5 to 12 membered heteroaryl group In some embodiments, the pentaerythritol diphosphite-based compound may be included in an amount from 0.1 wt % to 5.0 wt % based on a total weight of the electrolyte solution.

In some embodiments, the electrolyte solution for a lithium secondary battery may further include at least one additive selected from the group consisting of a cyclic carbonate-based compound including a double bond, a fluorine-substituted cyclic carbonate-based compound, a sultone-based compound and a cyclic sulfate-based compound.

In some embodiments, the organic solvent may include at least one selected from the group consisting of ethylene carbonate, ethyl methyl carbonate, dimethyl carbonate and diethyl carbonate.

According to exemplary embodiments, a lithium secondary battery includes a case, an electrode assembly including a cathode and an anode, and the electrolyte solution for a lithium secondary battery according to embodiments as described above injected into the case.

An electrolyte solution for a lithium secondary battery according to exemplary embodiments of the present invention may include a pentaerythritol diphosphite-based compound having a specific substituent. The pentaerythritol diphosphite-based compound including the specific substituent may form a cathode-electrolyte interphase (CEI) having improved stability on a surface of a cathode. Accordingly, a side reaction between a cathode active material and the electrolyte solution may be effectively suppressed, and hydrogen fluoride (HF) in the electrolyte solution may be easily removed.

A lithium secondary battery may include the above-described electrolyte solution, so that high-temperature storage properties (e.g., a capacity retention, a capacity recovery, a suppression of an increase of an internal resistance, etc.) may be improved. Further, the increase of the internal resistance may be suppressed even when stored at a low temperature to provide improved charge/discharge capacities.

DESCRIPTION OF THE INVENTION

Figure 1:
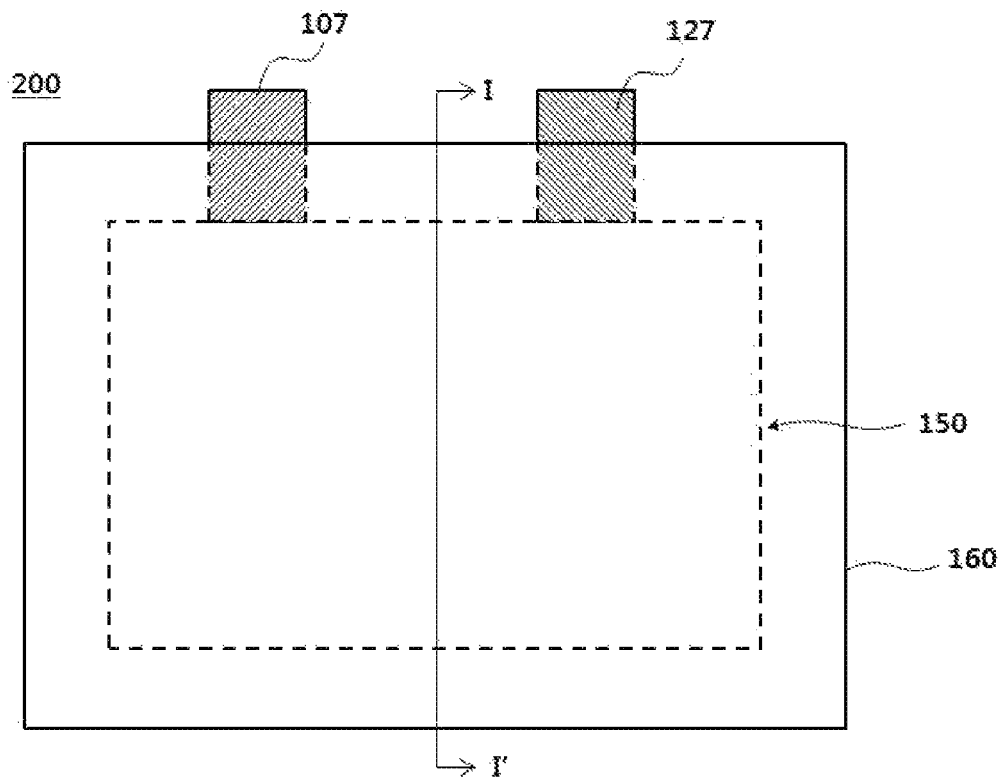
FIGS. 1 and 2 are a schematic top planar view and a schematic cross-sectional view, respectively, illustrating a lithium secondary battery in accordance with exemplary embodiments.

According to exemplary embodiments of the present invention, an electrolyte solution for a lithium secondary battery including a compound of a specific structure is provided. According to exemplary embodiments of the present invention, a lithium secondary battery including the electrolyte solution is also provided.

Hereinafter, embodiments of the present invention will be described in detail with reference to the accompanying drawings and experimental examples. However, those skilled in the art will appreciate that such embodiments are provided to further understand the spirit of the present invention and do not limit subject matters to be protected as disclosed in the detailed description and appended claims.

<Electrolyte Solution for Lithium Secondary Battery>

An electrolyte solution for a lithium secondary battery (hereinafter, that may be abbreviated as an electrolyte solution) according to embodiments of the present invention may include an organic solvent, a lithium salt mixed or dissolved in the organic solvent, and a pentaerythritol diphosphite-based compound including a specific substituent.

The organic solvent may include, e.g., an organic compound that may provide a sufficient solubility for the lithium salt and may not have a reactivity in the battery.

In an embodiment, the organic solvent may include a carbonate-based solvent, an ester-based solvent, an ether-based solvent, a ketone-based solvent, an alcohol-based solvent, an aprotic solvent, or the like. These may be used alone or in combination of therefrom.

The carbonate-based solvent may include, e.g., dimethyl carbonate (DMC), ethyl methyl carbonate (EMC), diethyl carbonate (DEC), methyl propyl carbonate, ethyl propyl carbonate, dipropyl carbonate, ethylene carbonate (EC), propylene carbonate (PC), butylene carbonate, etc. These may be used alone or in combination of therefrom.

The ester-based solvent may include, e.g., methyl acetate (MA), ethyl acetate (EA), n-propyl acetate (n-PA), 1,1-dimethylethyl acetate (DMEA), methyl propionate (MP), ethyl propionate (EP), gamma-butyrolactone (GBL), decanolide, valerolactone, mevalonolactone, etc. These may be used alone or in combination of therefrom.

The ether-based solvent may include, e.g., dibutyl ether, tetraethylene glycol dimethyl ether (TEGDME), diethylene glycol dimethyl ether (DEGDME), dimethoxyethane, tetrahydrofuran (THF), 2-methyltetrahydrofuran, etc. These may be used alone or in combination of therefrom.

The ketone-based solvent may include, e.g., cyclohexanone.

The alcohol-based solvent may include, e.g., ethyl alcohol, isopropyl alcohol, etc.

The aprotic solvent may include, e.g., a nitrile-based solvent, an amide-based solvent (e.g., dimethylformamide), a dioxolane-based solvent (e.g., 1,3-dioxolane), sulfolane, etc. These may be used alone or in combination of therefrom.

In some embodiments, the organic solvent may include the carbonate-based solvent. For example, the organic solvent may include at least one of ethylene carbonate (EC), ethylmethyl carbonate (EMC), dimethyl carbonate (DMC) and diethyl carbonate (DEC).

The electrolyte solution may include the lithium salt, and the lithium salt may be represented by $Li^+X^-$.

The anion ($X^-$) of the lithium salt may include, e.g., $F^-$, $Cl^-$, $Br^-$, $I^-$, $NO_3^-$, $N(CN)_2^-$, $BF_4^-$, $ClO_4^-$, $PF_6^-$, $SbF_6^-$, $AsF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc. These may be used alone or in a combination thereof.

In some embodiments, the lithium salt may include at least one of $LiBF_4$ and $LiPF_6$.

In an embodiment, the lithium salt may be included in a concentration from about 0.01 M to about 5 M, preferably from about 0.01 M to 2 M with respect to the organic solvent. Within the above range, a transfer of lithium ions and/or electrons may be promoted during charging and discharging of the lithium secondary battery, thereby providing improved capacity.

In exemplary embodiments, the electrolyte solution may include a pentaerythritol diphosphite-based compound including a specific substituent.

The pentaerythritol diphosphite-based compound may include at least one substituent selected from the group consisting of a silyl group, a sulfonyl group, a phosphoryl group and a phosphino group.

The pentaerythritol diphosphite-based compound may form a cathode-electrolyte interphase (CEI) having enhanced structural stability on a surface of a cathode. Accordingly, a side reaction between a cathode active material and the electrolyte solution may be effectively suppressed, and hydrogen fluoride (HF) in the electrolyte solution may be easily removed.

Thus, a lithium secondary battery having improved high-temperature storage properties (e.g., a capacity retention, a capacity recovery, a suppression of an internal resistance increase, etc.) and low temperature properties (a suppression of an internal resistance increase, alife-span, etc.) may be implemented.

In an embodiment, the pentaerythritol diphosphite-based compound may be represented by Chemical Formula 1 below.

[Chemical Formula 1]

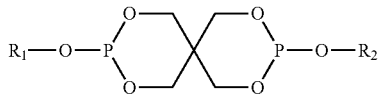

In Chemical Formula 1, $R_1$ and $R_2$ are each independently hydrogen, a $C_1$ to $C_{10}$ alkyl group, $-SiR_3R_4R_5$, $-SO_2R_6$, $-P(OR_7)_2$ or $-P(O)(OR_8)_2$, and at least one of $R_1$ and $R_2$ is $-SiR_3R_4R_5$, $-SO_2R_6$, $-P(OR_7)_2$ or $-P(O)(OR_8)_2$.

$R_3$ to $R_8$ are each independently a substituted or unsubstituted $C_1$ to C10 alkyl group, a substituted or unsubstituted $C_6$ to $C_{12}$ aryl group, or a substituted or unsubstituted 5 to 12 membered heteroaryl group.

A plurality of each of $R_3$ to $R_8$ may be present in the structure represented by Chemical Formula 1. In this case, a plurality of $R_3$ may be the same as or different from each other. Similarly, each of a plurality of $R_4$, $R_5$, $R_6$, $R_7$ and $R_8$ may be the same as or different from each other.

The heteroaryl group may include at least one hetero atom selected from N, O and S.

In the 5-12 membered heteroaryl group, the term "5-12 membered" indicates that the number of atoms constituting the ring is 5 to 12.

For example, a substituent that may be included in $R_3$ to $R_8$ may be at least one selected from halogen, a C1 to C6 alkyl group, a C3 to C6 cycloalkyl group, a C1 to C6 alkoxy group or a 3 to 7 membered hetero cycloalkyl group, a C6 to C12 aryl group, a 5 to 7 membered heteroaryl group, a hydroxy group (—OH), $-NR_9R_{10}$ ($R_9$ and $R_{10}$ are each independently hydrogen or a C1 to C6 alkyl group), a nitro group ($-NO_2$) and a cyano group ($-CN$).

In some embodiments, the pentaerythritol diphosphite-based compound may include at least one of compounds represented by Chemical Formulae 2 to 5 below.

[Chemical Formula 2]

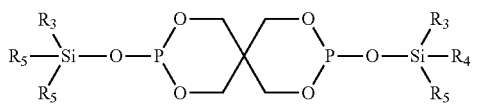

[Chemical Formula 3]

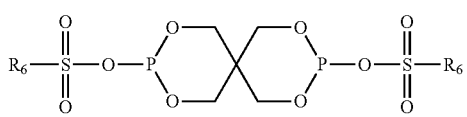

[Chemical Formula 4]

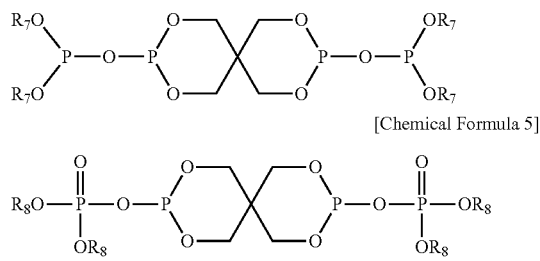

[Chemical Formula 5]

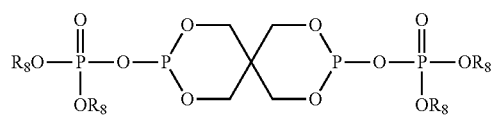

In Chemical Formulae 2 to 5, $R_3$ to $R_8$ may be each independently a substituted or unsubstituted C1 to C10 alkyl group, a substituted or unsubstituted C6 to C12 aryl group, or a substituted or unsubstituted 5-12 membered heteroaryl group.

If at least one of the compounds represented by Chemical Formulae 2 to 5 is included, the secondary battery having improved capacity retention and capacity recovery properties even at high and low temperatures may be implemented.

In an embodiment, the pentaerythritol diphosphite-based compound may be included in an amount of 0.1 weight percent (wt %) to 5.0 wt % based on a total weight of the electrolyte solution.

If the amount of the pentaerythritol diphosphite-based compound is less than 0.1 wt %, high-temperature storage properties of the secondary battery may be deteriorated. If the content of the pentaerythritol diphosphite-based compound is greater than 5.0 wt %, the pentaerythritol diphosphite-based compound may be oxidized during a battery operation, thereby reducing the capacity and life-span of the battery.

In a preferable embodiment, the pentaerythritol diphosphite-based compound may be included in an amount from 0.5 wt % to 3 wt %, more preferably, in an amount from 0.5 wt % to 1.5 wt %, based on the total weight of the electrolyte solution.

For example, a metal (e.g., a transition metal) may be eluted from the cathode during repeated charge/discharge. The eluted metal may be electrodeposited on an anode to deteriorate the anode performance. Further, when the lithium secondary battery is driven at a high voltage, a film on the surface of the cathode may be decomposed to cause a side reaction between the surface of the cathode and the electrolyte solution.

For example, the silyl group, the sulfonyl group, the phosphoryl group and the phosphino group included in the pentaerythritol diphosphite-based compound may accelerate the CEI formation reaction on the surface of the cathode. Accordingly, a cathode structure of the secondary battery including the electrolyte solution may be stabilized, and thus high temperature and low temperature properties of the secondary battery may be both improved.

In an embodiment, the electrolyte solution may further include an additive, and the additive may include a cyclic carbonate-based compound including a double bond, a fluorine-substituted cyclic carbonate-based compound, a sultone-based compound, a cyclic sulfate-based compound, or the like.

The cyclic carbonate-based compound including the double bond may include vinylene carbonate, vinyl ethylene carbonate, or the like.

The fluorine-substituted cyclic carbonate-based compound may include fluoroethylene carbonate.

The cyclic carbonate-based compound including the double bond and the fluorine-substituted cyclic carbonate-based compound may improve thermal and electrical durability of a film formed on an electrode surface.

For example, each of the cyclic carbonate-based compound including the double bond and the fluorine-substituted cyclic carbonate-based compound may be included in an amount from 0.1 wt % to 5 wt % based on the total weight of the electrolyte solution. If the content is less than 0.1 wt %, durability of the film may be degraded. If the content is greater than 5 wt %, a thickness of the film may be excessively increased to increase resistance of the battery and decrease power of the battery.

The sultone-based compound may include 1,3-propane sultone, 1,3-propene sultone, 1,4-butane sultone, or the like.

The cyclic sulfate-based compound may include 1,2-ethylene sulfate, 1,2-propylene sulfate, or the like.

The sultone-based compound and the cyclic sulfate-based compound may form a more stable ion conductive film on the surface of the electrode.

In some embodiments, the electrolyte solution may be a non-aqueous electrolyte that may be substantially devoid of water.

<Lithium Secondary Battery>

According to embodiments of the present invention, a lithium secondary battery including the electrolyte solution as described above is provided.

Figure 2:
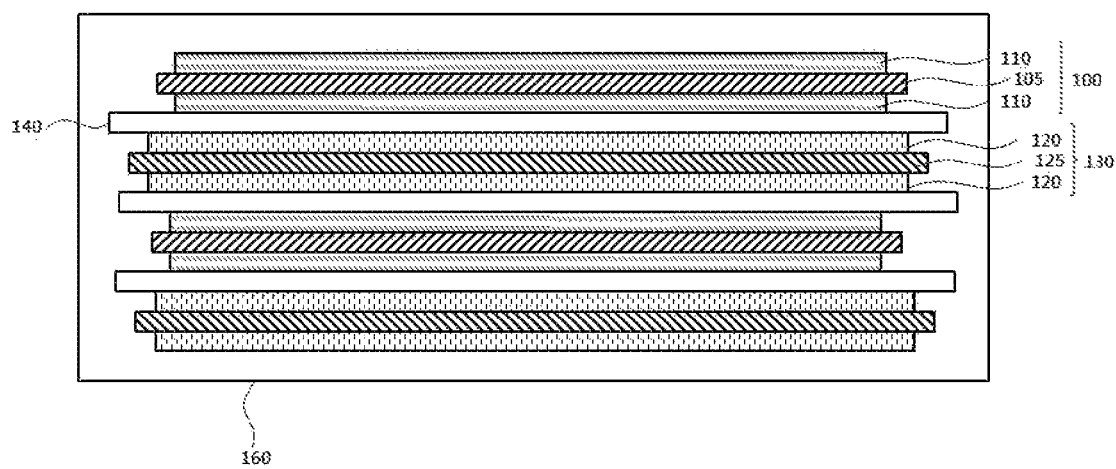

FIGS. 1 and 2 are a schematic top planar view and a schematic cross-sectional view, respectively, illustrating a lithium secondary battery in accordance with exemplary embodiments. Specifically, FIG. 2 is a cross-sectional view taken along line I-I' of FIG. 1.

Referring to FIGS. 1 and 2, a lithium secondary battery may include an electrode assembly including a cathode 100, an anode 130 and a separation layer 140 interposed between the cathode and the anode. The electrode assembly may be accommodated in a case 160 together with the electrolyte solution according to the above-described exemplary embodiments to be impregnated therein.

The cathode 100 may include a cathode current collector 105 and a cathode active material layer 110 formed on the cathode current collector 105.

For example, a cathode slurry may be prepared by mixing and stirring a cathode active material in a solvent with a binder, a conductive material, a dispersive agent, etc. The slurry may be coated on the cathode current collector 105, and then dried and pressed to form the cathode 100.

The cathode current collector 105 may include stainless-steel, nickel, aluminum, titanium, copper or an alloy thereof. Preferably, aluminum or an alloy thereof may be used.

The cathode active material may be a material capable of reversible insertion and deintercalation of lithium ions. The cathode active material may include, e.g., a lithium metal oxide including a metal element such as nickel, cobalt, manganese, aluminum, etc.

For example, the lithium metal oxide may be represented by Chemical Formula 12 below.

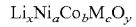  [Chemical Formula 12]

In Chemical Formula 12, M is at least one of Al, Zr, Ti, Cr, B, Mg, Mn, Ba, Si, Y, W, and Sr, and $0.9 \leq x \leq 1.1$, $1.9 \leq y \leq 2.1$, $0.5 \leq a \leq 1$, $0 \leq c/(a+b) \leq 0.13$, and $0 \leq c \leq 0.11$.

In some embodiments, a content of nickel in the lithium metal oxide among elements other than lithium and oxygen may be 60 mol % or more, more preferably 80 mol % or more.

For example, in Chemical Formula 12, $0.6 \leq a \leq 1$, and more preferably $0.8 \leq a \leq 1$.

In some embodiments, the above-described cathode active material or the lithium metal oxide may further include a coating element or a doping element. For example, the coating element or the doping element may include Al, Ti, Ba, Zr, Si, B, Mg, P, Sr, W, La, an alloy thereof or an oxide thereof. These may be used alone or in combination therefrom. The cathode active material may be passivated by the coating element or the doping element, so that stability with respect to a penetration by an external object and life-span may be further improved.

When the content of nickel in the lithium metal oxide is increased, relatively chemical stability, for example, high temperature storage characteristics may be deteriorated. However, in the case of the battery including the electrolyte according to the present invention, excellent high-temperature storage characteristics can be realized even when the high-nickel lithium metal oxide is included as a positive electrode active material.

If the content of nickel in the lithium metal oxide becomes greater, chemical stability, for example, high-temperature storage property may be degraded. However, the battery containing the electrolyte solution according to embodiments as described above may provide improved high-temperature storage property even though a high-nickel lithium metal oxide is included as the cathode active material.

The binder for the cathode may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

The conductive material may include a carbon-based material such as graphite, carbon black, graphene, carbon nanotube, etc., and/or a metal-based material such as tin, tin oxide, titanium oxide, a perovskite material such as LaSrCoO$_3$ or LaSrMnO$_3$, etc.

The anode 130 may include an anode current collector 125 and an anode active material layer 120 on the anode current collector 125.

The anode active material layer 120 may include an anode material optionally with an anode binder and a conductive material.

For example, the anode active material may be mixed and stirred together with the anode binder, the conductive material in a solvent to form an anode slurry. The anode slurry may be coated on the anode current collector 125, dried and pressed to obtain the anode 130.

The anode current collector 125 may include gold, stainless-steel, nickel, aluminum, titanium, copper or an alloy thereof, preferably, may include copper or a copper alloy.

The anode active material may include a material which may be capable of adsorbing and ejecting lithium ions. For example, a carbon-based material such as a crystalline carbon, an amorphous carbon, a carbon complex or a carbon fiber, a lithium alloy, silicon-based material, etc., may be used.

The amorphous carbon may include a hard carbon, cokes, a mesocarbon microbead (MCMB) fired at a temperature of 1500° C. or less, a mesophase pitch-based carbon fiber (MPCF), etc. The crystalline carbon may include an artificial graphite, natural graphite, graphitized cokes, graphitized MCMB, graphitized MPCF, etc.

The silicon-based material may include, e.g., Si, SiO$_x$ (0<x<2), Si/C, SiO/C, Si-metal, etc.

The lithium alloy may further include aluminum, zinc, bismuth, cadmium, antimony, silicon, lead, tin, gallium, indium, etc.

The binder and the conductive material substantially the same as or similar to those mentioned above may also be used in the anode. In some embodiments, the binder for forming the anode may include, e.g., an aqueous binder such as styrene-butadiene rubber (SBR) for compatibility with the carbon-based active material, and may be used together with a thickener such as carboxymethyl cellulose (CMC).

The separation layer 140 may be interposed between the cathode 100 and the anode 130. In some embodiments, an area and/or a volume of the anode 130 (e.g., a contact area with the separation layer 140) may be greater than that of the cathode 100. Thus, lithium ions generated from the cathode 100 may be easily transferred to the anode 130 without a loss by, e.g., precipitation or sedimentation.

The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like.

The separation layer 140 may also include a non-woven fabric formed from a glass fiber with a high melting point, a polyethylene terephthalate fiber, or the like.

An electrode cell may be defined by the cathode 100, the anode 130 and the separation layer 140, and a plurality of the electrode cells may be stacked to form the electrode assembly 150 that may have e.g., a jelly roll shape. For example, the electrode assembly 150 may be formed by winding, laminating or z-folding the separation layer 140.

The electrode assembly may be accommodated together with the electrolyte solution according to exemplary embodiments in the case 160 to define a lithium secondary battery.

As illustrated in FIG. 1, an electrode tab (a cathode tab or an anode tab) may protrude from each of the cathode current collector 105 and the anode current collector 125 included in each electrode cell and may extend to one side of the case 160. The electrode tab may be connected to an electrode lead (an anode lead 107 or a cathode lead 127) extending to an outside of the case 160.

The lithium secondary battery may be fabricated into a cylindrical shape using a can, a prismatic shape, a pouch shape, a coin shape, etc.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

EXAMPLES AND COMPARATIVE EXAMPLES

Comparative Example 1

(1) Preparation of Electrolyte Solution 1.0 M solution of LiPF$_6$ (a mixed solvent of EC/EMC/DEC in a 25:45:30 volume ratio) was prepared. Based on a total weight of the electrolyte solution, 1 wt % of fluoroethylene carbonate (FEC), 0.3 wt % of vinylethylene carbonate (VC), 1 wt % of LiPO$_2$F$_2$, 0.5 wt % of 1,3-propane sultone (PS) and 0.5 wt % of 1,3-propene sultone (PRS) was added in the LiPF$_6$ solution, and mixed to prepare an electrolyte solution of Comparative Example 1.

(2) Fabrication of Lithium Secondary Battery Sample

A cathode active material including Li[Ni$_{0.6}$Co$_{0.2}$Mn$_{0.2}$]O$_2$ and Li[Ni$_{0.8}$Co$_{0.1}$Mn$_{0.1}$]O$_2$ in a weight ratio of 6:4, a carbon black conductive material and a polyvinylidene fluoride (PVdF) binder were mixed in a weight ratio of 92:5:3 to prepare a cathode slurry.

The cathode slurry was uniformly coated on an area excluding protrusions of an aluminum foil (thickness: 15 μm) having the protrusions (cathode tab portions) on one side thereof, and then dried and presses to form a cathode.

An anode slurry was prepared by mixing an anode active material including artificial graphite and natural graphite in a weight ratio of 7:3, a styrene-butadiene rubber (SBR) binder and a carboxymethyl cellulose (CMC) thickener in a weight ratio of 97:1:2.

The anode slurry was uniformly coated on an area excluding protrusions of a copper foil (thickness: 15 μm) having the protrusions (anode tab portions) on one side thereof, and then dried and presses to form an anode.

An electrode assembly was formed by interposing a polyethylene separator (thickness: 20 μm) between the cathode and the anode. A cathode lead and an anode lead were welded and connected to the cathode tab and the anode tab, respectively.

The electrode assembly was accommodated in a pouch (case) such that portions of the cathode lead and the anode lead were exposed to an outside, and three sides except for an electrolyte injection side were sealed.

The electrolyte solution prepared in the above (1) was injected, and electrolyte injection side was also sealed, and impregnated for 12 hours to fabricate a lithium secondary battery sample.

Comparative Examples 2 and 3

Lithium secondary battery samples were fabricated by the same method as that in Comparative Example 1 except that compounds represented by Chemical Formula 6 (Comparative Example 2) and Chemical Formula 7 (Comparative Example 3) were added in an amount of 1 wt % based on the total weight of the electrolyte solution.

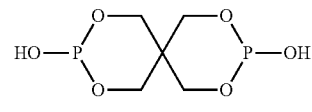

[Chemical Formula 6]

[Chemical Formula 7]

Examples 1 to 4

Lithium secondary battery samples were fabricated by the same method as that in Comparative Example 1 except that compounds represented by Chemical Formula 8 (Example 1), Chemical Formula 9 (Example 2), Chemical Formula 10 (Example 3) or Chemical Formula 11 (Example 4) was added in an amount of 1 wt % based on the total weight of the electrolyte solution.

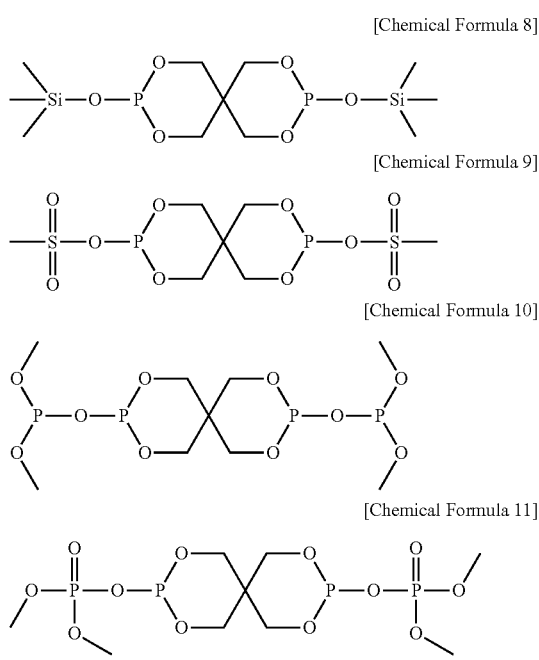

Examples 5 to 8

Lithium secondary battery samples were fabricated by the same method as that in Comparative Example 1 except that the compound represented by Chemical Formula 8 was added in an amount of 0.5 wt % (Example 5), 0.4 wt % (Example 6), 3 wt % (Example 7) and 4 wt % (Example 8) based on the total weight of the electrolyte solution.

Experimental Example 1: Evaluation on Initial Properties (Room Temperature, 25° C.)

(1) Evaluation on Initial Capacity

The batteries of Examples and Comparative Examples were charged (0.5 C-rate CC/CV; 4.2V, 0.05 C cut-off) and discharged (0.5 C-rate CC; 2.7V cut-off) three times. A discharge capacity at the third cycle was measured as an initial capacity of the battery.

(2) Evaluation on Initial Thickness of Battery

The batteries of Examples and Comparative Examples were charged (0.5 C-rate CC/CV; 4.2V, 0.05 C cut-off) at room temperature, and then a thickness of the battery was measured using a plate thickness measuring device (Mitutoyo, 543-490B).

(3) Evaluation on Internal Resistance (C_DCIR and D_DCIR)

At an SOC 60% point, C-rate was changed to 0.2 C, 0.5 C, 1.0 C, 1.5 C, 2.0 C, 2.5 C and 3.0 C, and a voltage termination point when charging and discharging by the corresponding C-rate for 10 seconds was included in a linear equation. A slope of the equation was measured as DCIR.

Experimental Example 2: Evaluation on Performance at Low Temperature (−10° C.)

(1) Evaluation on Capacity at Low Temperature

The batteries of Examples and Comparative Examples were charged (0.5 C-rate CC/CV; 4.2V, 0.05 C cut-off) in a chamber at −10° C. and a charge capacity was measured. Thereafter, the batteries were discharged (0.5 C-rate CC; 2.7V cut-off) and then a discharge capacity was measured.

(2) Evaluation on Internal Resistance (C_DCIR and D_DCIR) at Low Temperature

The batteries of Examples and Comparative Examples were left in a chamber at −10° C. for 4 hours, and an internal resistance (C_DCIR and D_DCIR) was evaluated.

The internal resistance was measured by the same method as the described in the above (3) in Experimental Example 1.

Experimental Example 3: Evaluation on Storage Property at High Temperature

The batteries of Examples and Comparative Examples were left to be exposed to an air at 60° C. for 5 weeks using a thermostat, and further were left at room temperature for 30 minutes. Thereafter, properties after storage at high temperature were evaluated as follows.

(1) Evaluation on Battery Thickness after High-Temperature Storage

After charging the batteries of Examples and Comparative Examples were stored at the high temperature, thicknesses of the batteries were measured using a plate thickness measuring device (Mitutoyo, 543-490B).

(2) Capacity Retention (Ret) Evaluation after High Temperature Storage

The charged batteries of Examples and Comparative Examples were stored at the high temperature, and a 0.5 C-rate CC discharge (2.7V cut-off) was performed to measure a discharge capacity.

The capacity retention was calculated as a percentage by dividing the discharge capacity after the high-temperature storage by the initial capacity measured in the above (1) of Experimental Example 1 as defined in the following equation.

Capacity retention (%)=(discharge capacity after high-temperature storage/initial capacity)×100

(3) Evaluation of Capacity Recovery (Rec) after High Temperature Storage

After measuring the capacity retention according to the above (2) for the batteries of Examples and Comparative Examples, 0.5 C-rate CC/CV charge (4.2V, 0.05 C cut-off) and 0.5 C-rate CC discharge (2.7V cut-off)-off) were performed to measure a discharge capacity.

The capacity recovery was calculated as a percentage by dividing the measured discharge capacity by the initial capacity measured in the above (1) of Experimental Example 1.

Capacity recovery (%)=(discharge capacity measured after evaluation of the capacity retention/initial capacity)×100

(4) Evaluation of Internal Resistance (DCIR) after High Temperature Storage

At an SOC 60% point, C-rate was changed to 0.2 C, 0.5 C, 1.0 C, 1.5 C, 2.0 C, 2.5 C and 3.0 C, and a voltage termination point when charging and discharging by the corresponding C-rate for 10 seconds was included in a linear equation. A slope of the equation was measured as DCIR.

The measurement results are shown in Tables 1 and 2 below.

TABLE 1

|  |  | Example 1 | Example 2 | Example 3 | Example 4 | Example 5 | Example 6 |
|---|---|---|---|---|---|---|---|
| Initial Property | Capacity (mAh) | 1689 | 1699 | 1705 | 1705 | 1700 | 1702 |
|  | Thickness (mm) | 5.49 | 5.52 | 5.50 | 5.51 | 5.50 | 5.49 |
|  | C_DCIR (mΩ) | 43.3 | 43.3 | 43.4 | 42.9 | 44.3 | 44.1 |
|  | D_DCIR (mΩ) | 44.9 | 45.0 | 45.0 | 44.7 | 45.3 | 45.2 |
| −10° C. Property | C_DCIR (mΩ) | 166 | 169 | 166 | 175 | 166 | 175 |
|  | D_DCIR (mΩ) | 149 | 157 | 153 | 155 | 153 | 163 |
|  | Charge Capacity (mAh) | 391 | 380 | 387 | 373 | 393 | 370 |
|  | Discharge Capacity (mAh) | 354 | 346 | 350 | 340 | 350 | 329 |
| 60° C. 5 weeks Storage | Thickness (mm) | 5.62 | 5.69 | 5.64 | 5.72 | 5.71 | 5.75 |
|  | C_DCIR (mΩ) | 44.4 | 50.9 | 48.7 | 53.8 | 44.0 | 56.0 |
|  | D_DCIR (mΩ) | 53.6 | 57.7 | 55.5 | 59.8 | 54.2 | 62.3 |
|  | Ret. (%) | 85 | 83 | 85 | 80 | 83 | 72 |
|  | Rec. (%) | 84 | 82 | 84 | 78 | 82 | 71 |

TABLE 2

|  |  | Example 7 | Example 8 | Comparative Example 1 | Comparative Example 2 | Comparative Example 3 |
|---|---|---|---|---|---|---|
| Initial Property | Capacity (mAh) | 1688 | 1675 | 1736 | 1721 | 1715 |
|  | Thickness (mm) | 5.59 | 5.55 | 5.51 | 5.53 | 5.50 |
|  | C_DCIR (mΩ) | 43.6 | 44.9 | 43.2 | 43.9 | 43.5 |
|  | D_DCIR (mΩ) | 45.6 | 46.6 | 44.4 | 44.4 | 45.0 |
| −10° C. Property | C_DCIR (mΩ) | 172 | 183 | 185 | 177 | 181 |
|  | D_DCIR (mΩ) | 156 | 166 | 166 | 159 | 161 |
|  | Charge Capacity (mAh) | 377 | 363 | 362 | 370 | 366 |
|  | Discharge Capacity (mAh) | 346 | 322 | 320 | 337 | 330 |
| 60° C. 5 weeks Storage | Thickness (mm) | 5.72 | 5.85 | 5.83 | 5.79 | 5.74 |
|  | C_DCIR (mΩ) | 52.7 | 59.8 | 63.0 | 54.0 | 57.9 |
|  | D_DCIR (mΩ) | 58.9 | 66.1 | 69.1 | 60.4 | 64.9 |
|  | Ret. (%) | 77 | 73 | 70 | 74 | 75 |
|  | Rec. (%) | 76 | 72 | 69 | 73 | 73 |

Referring to Tables 1 and 2, the secondary batteries according to Examples 1 to 8 provided higher high-temperature storage properties (e.g., the capacity retention, the capacity recovery and an inhibition of resistance increase) compared to those from the secondary batteries of Comparative Examples 1 to 3.

Additionally, the secondary batteries according to Examples 1 to 8 provided improved charge and discharge properties at the low temperature compared to those from the secondary batteries of Comparative Examples 1 to 3 while suppressing the increase of the internal resistance.

What is claimed is:
1. An electrolyte solution for a lithium secondary battery, comprising:
   an organic solvent;
   a lithium salt; and
   a pentaerythritol diphosphite-based compound comprising at least one substituent selected from the group consisting of a silyl group, a sulfonyl group, a phosphoryl group and a phosphino group
wherein the pentaerythritol diphosphite-based compound is represented by Chemical Formula 1:

[Chemical Formula 1]

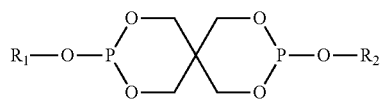

wherein, in Chemical Formula 1, $R_1$ and $R_2$ are each independently hydrogen, a $C_1$ to $C_{10}$ alkyl group, —$SiR_3R_4R_5$, —$SO_2R_6$, —$P(OR_7)_2$ or —$P(O)(OR_8)_2$, at least one of $R_1$ and $R_2$ is —$SiR_3R_4R_5$, —$SO_2R_6$, —$P(OR_7)_2$ or —$P(O)(OR_8)_2$, and $R_3$ to $R_8$ are each independently a substituted or unsubstituted $C_1$ to $C_{10}$ alkyl group, a substituted or unsubstituted $C_6$ to $C_{12}$ aryl group, or a substituted or unsubstituted 5 to 12 membered heteroaryl group.

2. The electrolyte solution for a lithium secondary battery according to claim 1, wherein the pentaerythritol diphosphite-based compound comprises at least one of compounds represented by Chemical Formulae 2 to 5:

[Chemical Formula 2]

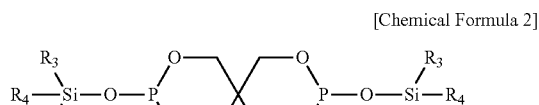

[Chemical Formula 3]

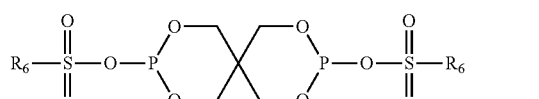

[Chemical Formula 4]

[Chemical Formula 5]

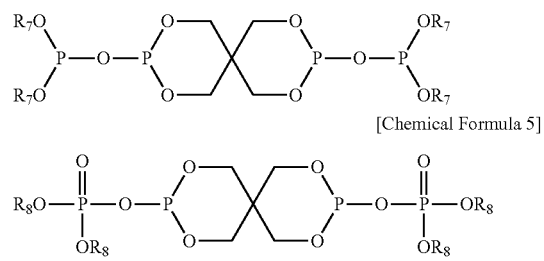

wherein, in Chemical Formulae 2 to 5, $R_3$ to $R_8$ are each independently a substituted or unsubstituted $C_1$ to C10 alkyl group, a substituted or unsubstituted $C_6$ to $C_{12}$ aryl group, or a substituted or unsubstituted 5 to 12 membered heteroaryl group.

3. The electrolyte solution for a lithium secondary battery according to claim 1, wherein the pentaerythritol diphosphite-based compound is included in an amount from 0.1 wt % to 5.0 wt % based on a total weight of the electrolyte solution.

4. The electrolyte solution for a lithium secondary battery according to claim 1, further comprising at least one additive selected from the group consisting of a cyclic carbonate-based compound comprising a double bond, a fluorine-substituted cyclic carbonate-based compound, a sultone-based compound and a cyclic sulfate-based compound.

5. The electrolyte solution for a lithium secondary battery according to claim 1, wherein the organic solvent comprises at least one selected from the group consisting of ethylene carbonate, ethyl methyl carbonate, dimethyl carbonate and diethyl carbonate.

6. A lithium secondary battery, comprising:
a case;
an electrode assembly comprising a cathode and an anode; and
the electrolyte solution for a lithium secondary battery of claim 1 injected into the case.

* * * * *